(12) United States Patent
Zhang et al.

(10) Patent No.: US 11,099,696 B2
(45) Date of Patent: Aug. 24, 2021

(54) TOUCH SUBSTRATE, TOUCH CONTROL DISPLAY PANEL, TOUCH CONTROL DISPLAY APPARATUS, AND METHOD OF FABRICATING TOUCH SUBSTRATE

(71) Applicants: BOE TECHNOLOGY GROUP CO., LTD., Beijing (CN); Hefei Xinsheng Optoelectronics Technology Co., Ltd., Anhui (CN)

(72) Inventors: Donghui Zhang, Beijing (CN); Guodong Liu, Beijing (CN)

(73) Assignees: BOE TECHNOLOGY GROUP CO., LTD., Beijing (CN); Hefei Xinsheng Optoelectronics Technology Co., Ltd., Anhui (CN)

( * ) Notice: Subject to any disclaimer, the term of this patent is extended or adjusted under 35 U.S.C. 154(b) by 712 days.

(21) Appl. No.: 15/777,614

(22) PCT Filed: May 9, 2017

(86) PCT No.: PCT/CN2017/083565
§ 371 (c)(1),
(2) Date: May 18, 2018

(87) PCT Pub. No.: WO2018/205125
PCT Pub. Date: Nov. 15, 2018

(65) Prior Publication Data
US 2021/0173521 A1 Jun. 10, 2021

(51) Int. Cl.
*G06F 3/044* (2006.01)
(52) U.S. Cl.
CPC .......... *G06F 3/0446* (2019.05); *G06F 3/0445* (2019.05)

(58) Field of Classification Search
None
See application file for complete search history.

(56) References Cited

U.S. PATENT DOCUMENTS

2012/0273336 A1   11/2012   Kuriki
2014/0078104 A1*   3/2014   Lee ........................ G06F 3/0412
                                                                   345/174
(Continued)

FOREIGN PATENT DOCUMENTS

CN   102479995 A   5/2012
CN   102667680 A   9/2012
(Continued)

OTHER PUBLICATIONS

International Search Report & Written Opinion dated Feb. 14, 2018, regarding PCT/CN2017/083565.

*Primary Examiner* — Carl Adams
(74) *Attorney, Agent, or Firm* — Intellectual Valley Law, P.C.

(57) ABSTRACT

The present application discloses a touch substrate. The touch substrate includes a base substrate; a first touch electrode layer on the base substrate and including a plurality of first touch electrodes; a second touch electrode layer including a plurality of first coils; and a third touch electrode layer including a plurality of second coils. Each of the plurality of first touch electrodes is electrically connected to one of the plurality of first coils. The third touch electrode layer is insulated from the first touch electrode layer and the second touch electrode layer.

19 Claims, 7 Drawing Sheets

(56) References Cited

U.S. PATENT DOCUMENTS

2016/0124562 A1    5/2016  Lu et al.
2016/0328047 A1*  11/2016  Jin ..................... G06F 3/04166
2016/0342246 A1    11/2016  Xu
2017/0077593 A1    3/2017  Cheng et al.

FOREIGN PATENT DOCUMENTS

CN    104298411 A    1/2015
CN    104484086 A    4/2015

* cited by examiner

TOUCH SUBSTRATE, TOUCH CONTROL DISPLAY PANEL, TOUCH CONTROL DISPLAY APPARATUS, AND METHOD OF FABRICATING TOUCH SUBSTRATE

CROSS-REFERENCE TO RELATED APPLICATION

This application is a national stage application under 35 U.S.C. § 371 of International Application No. PCT/CN2017/083565, filed May 9, 2017, the contents of which are incorporated by reference in the entirety.

TECHNICAL FIELD

The present invention relates to display technology, more particularly, to a touch substrate, a touch control display panel, a touch control display apparatus, and a method of fabricating a touch substrate.

BACKGROUND

Electromagnetic touch screens enable features such as precise movement detection and hand writing-like original chirography, and have been widely adopted in many advanced computer aided design (CAD) systems such as AutoCAD. Conventional electromagnetic touch screens typically include an electromagnetic antenna panel attached to the back of the touch screen, including two layers of metal wires extending horizontally and vertically, respectively. The two layers of metal wires are insulated from each other by an insulating layer. When an electromagnetic pen approaches the touch screen, the electromagnetic wave passes through the wires, generating an induced electromotive force. The induced electromotive force is stronger in portions of the metal wires closer to the position of the electromagnetic pen.

SUMMARY

In one aspect, the present invention provides a touch substrate, comprising a base substrate; a first touch electrode layer on the base substrate and comprising a plurality of first touch electrodes; a second touch electrode layer comprising a plurality of first coils; and a third touch electrode layer comprising a plurality of second coils; wherein each of the plurality of first touch electrodes is electrically connected to one of the plurality of first coils; and the third touch electrode layer is insulated from the first touch electrode layer and the second touch electrode layer.

Optionally, the plurality of first touch electrodes are a plurality of capacitive touch electrodes; and the plurality of first coils and the plurality of second coils are a plurality of electromagnetic touch electrodes.

Optionally, each of the plurality of first coils has an outline shape substantially the same as one of the plurality of first touch electrodes in a display area.

Optionally, the plurality of first touch electrodes are substantially along a first direction, each of the plurality of first touch electrodes comprising a plurality of first touch electrode blocks extending substantially along a second direction; the plurality of first coils are substantially along the first direction, each of the plurality of first coils extending substantially along the second direction; the plurality of second coils are substantially along the second direction, each of the plurality of second coils extending substantially along the first direction; and adjacent first touch electrode blocks of the plurality of first touch electrode blocks in each of the plurality of first touch electrodes are electrically connected together by one of the plurality of first coils.

Optionally, wirings of each of the plurality of first coils extend substantially along edges of at least one of the plurality of first touch electrode blocks in the one of the plurality of first touch electrodes.

Optionally, wirings of each of the plurality of first coils is in contact with the edges of at least one of the plurality of first touch electrode blocks in the one of the plurality of first touch electrodes.

Optionally, an area encircled by a projection of wirings of each of the plurality of first coils on the base substrate substantially overlaps with a projection of the one of the plurality of first touch electrodes on the base substrate in a display area.

Optionally, wirings of each of the plurality of first coils in a region between adjacent first touch electrode blocks of the plurality of first touch electrode blocks are at a tilted angle with respect to the second direction.

Optionally, the touch substrate further comprises a fourth touch electrode layer comprising a plurality of fourth touch electrodes; wherein each of the plurality of fourth touch electrodes is electrically connected to one of the plurality of second coils; and the third touch electrode layer and the fourth electrode layer are insulated from the first touch electrode layer and the second touch electrode layer.

Optionally, the plurality of first touch electrodes are a plurality of touch scanning touch electrodes; and the plurality of fourth touch electrodes are a plurality of touch sensing touch electrodes.

Optionally, each of the plurality of second coils has an outline shape substantially the same as one of the plurality of fourth touch electrodes in a display area.

Optionally, the plurality of fourth touch electrodes are substantially along the second direction, each of the plurality of fourth touch electrodes comprising a plurality of fourth touch electrode blocks extending substantially along the first direction; and adjacent fourth touch electrode blocks of the plurality of fourth touch electrode blocks in each of the plurality of fourth touch electrodes are electrically connected together by one of the plurality of second coils.

Optionally, wirings of each of the plurality of second coils extend substantially along edges of at least one of the plurality of fourth touch electrode blocks in the one of the plurality of fourth touch electrodes.

Optionally, wirings of each of the plurality of second coils is in contact with the edges of at least one of the plurality of fourth touch electrode blocks in the one of the plurality of fourth touch electrodes.

Optionally, an area encircled by a projection of wirings of each of the plurality of second coils on the base substrate substantially overlaps with a projection of the one of the plurality of fourth touch electrodes on the base substrate in a display area.

Optionally, wirings of each of the plurality of second coils in a region between adjacent fourth touch electrode blocks of the plurality of fourth touch electrode blocks are at a tilted angle with respect to the first direction.

Optionally, the touch substrate further comprises an insulating layer between the second touch electrode layer and the third touch electrode layer.

Optionally, the first touch electrode layer and the fourth touch electrode layer are in a same layer; the touch substrate further comprises a plurality of vias extending through the insulating layer; and each of the plurality of second coils are electrically connected to the adjacent fourth touch electrode blocks of the plurality of fourth touch electrode blocks in one of the plurality of fourth touch electrodes, thereby connected the adjacent fourth touch electrode blocks.

Optionally, the plurality of first coils and the plurality of second coils cross over each other, forming a plurality of intersections.

In another aspect, the present invention provides a touch control display panel comprising the touch substrate described herein.

Optionally, the touch control display panel is an on-cell type touch control display panel.

Optionally, the touch control display panel is a one-glass-solution type touch control display panel.

In another aspect, the present invention provides a touch control display apparatus comprising the touch control display panel described herein.

In another aspect, the present invention provides a method of fabricating a touch substrate, comprising forming a first touch electrode layer, a second touch electrode layer, and a third touch electrode layer on a base substrate; wherein forming the first touch electrode layer comprises forming a plurality of first touch electrodes; forming the second touch electrode layer comprises forming a plurality of first coils; forming the third touch electrode layer comprises forming a plurality of second coils; and each of the plurality of first touch electrodes is formed to be electrically connected to one of the plurality of first coils.

BRIEF DESCRIPTION OF THE FIGURES

The following drawings are merely examples for illustrative purposes according to various disclosed embodiments and are not intended to limit the scope of the present invention.

DETAILED DESCRIPTION

Figure 1:
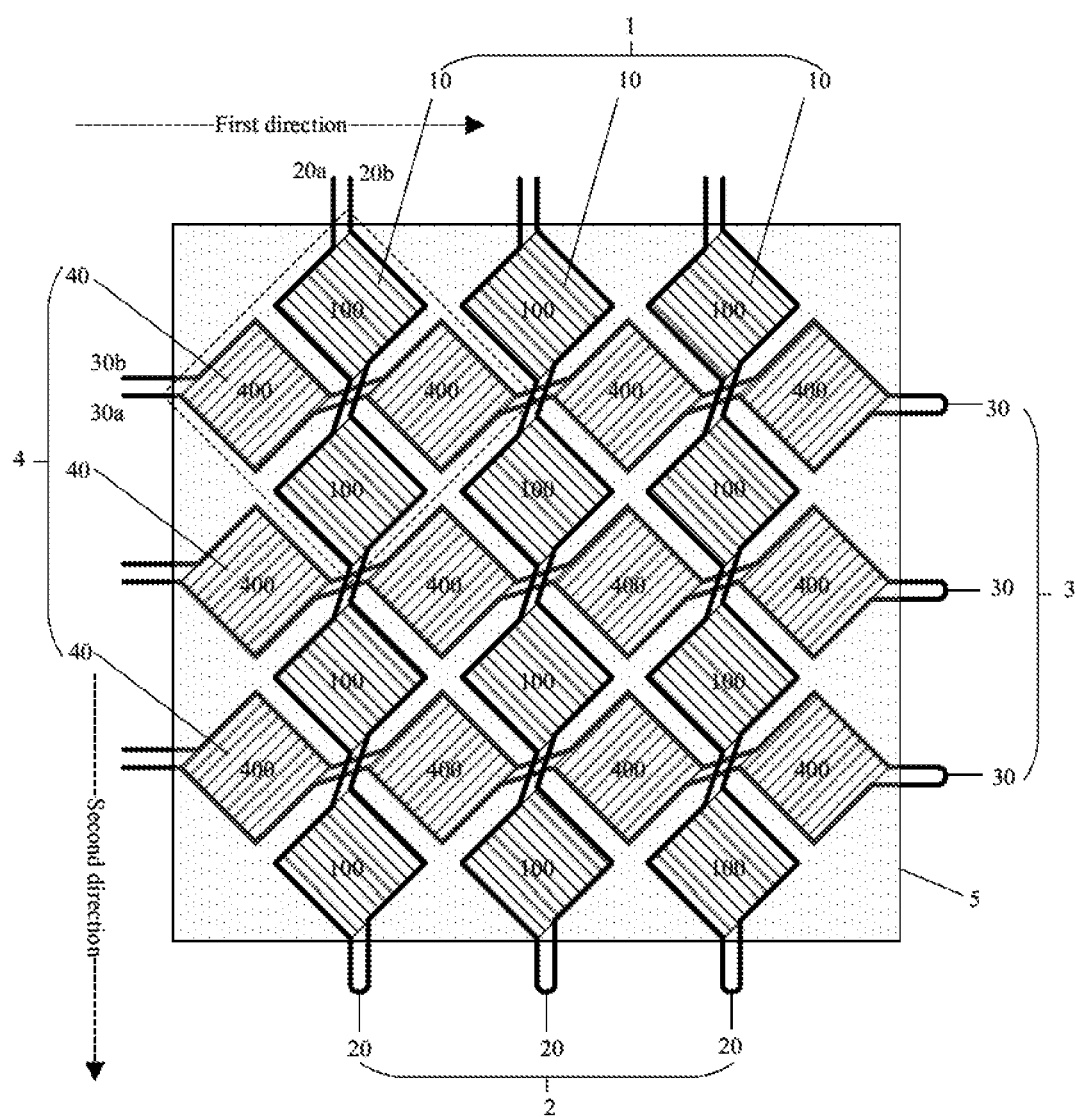
FIG. 1 is a schematic diagram illustrating the structure of a touch substrate in some embodiments according to the present disclosure.

The disclosure will now be described more specifically with reference to the following embodiments. It is to be noted that the following descriptions of some embodiments are presented herein for purpose of illustration and description only. It is not intended to be exhaustive or to be limited to the precise form disclosed.

In conventional integrated electromagnetic and capacitive touch control display panels, electromagnetic touch function and capacitive touch function are enabled by having both electromagnetic touch electrodes and capacitive touch electrodes in a same touch control display panel. However, in conventional integrated electromagnetic and capacitive touch control display panels, wires of the electromagnetic touch electrodes are typically linear stretches of straight lines, with a plurality of first electromagnetic touch electrodes extending along a first direction and a plurality of second electromagnetic touch electrodes extending along a second direction. The first direction and the second direction are typically substantially parallel to two directions of an array of subpixels in the display module. The conventional design induces interference between the linear stretches of straight lines of the electromagnetic touch electrodes and the display module, resulting in severe Moiré patterns in the touch control display panel. Display quality is adversely affected by the Moiré patterns.

Accordingly, the present disclosure provides, inter alia, a touch substrate, a touch control display panel, a touch control display apparatus, and a method of fabricating a touch substrate that substantially obviate one or more of the problems due to limitations and disadvantages of the related art. In one aspect, the present disclosure provides a touch substrate. In some embodiments, the touch substrate includes a base substrate; a first touch electrode layer on the base substrate and comprising a plurality of first touch electrodes; a second touch electrode layer comprising a plurality of first coils; and a third touch electrode layer comprising a plurality of second coils. Each of the plurality of first touch electrodes is electrically connected to one of the plurality of first coils. The first touch electrode layer and the second touch electrode layer are insulated from the third touch electrode layer. Optionally, the plurality of first touch electrodes are arranged substantially along a first direction, each of the plurality of first touch electrodes comprising a plurality of first touch electrode blocks extending substantially along a second direction; the plurality of first coils are arranged substantially along the first direction, each of the plurality of first coils extending substantially along the second direction; and the plurality of second coils are arranged substantially along the second direction, each of the plurality of second coils extending substantially along the first direction. Optionally, adjacent first touch electrode blocks of the plurality of first touch electrode blocks in each of the plurality of first touch electrodes are electrically connected together by one of the plurality of first coils.

Optionally, the plurality of first touch electrodes are a plurality of capacitive touch electrodes, e.g., a plurality of self-capacitive type touch electrodes, a plurality of touch scanning electrodes, or a plurality of touch sensing electrodes. Optionally, the plurality of first coils and the plurality of second coils are a plurality of electromagnetic touch electrodes configured to detect a touch signal by detecting an induction electromagnetic force, e.g., generated from a touch pen. The present touch substrate is a touch substrate having both a capacitive touch function and an electromagnetic touch function, capable of detecting a touch by detecting a change in capacitance and detecting a touch by detecting the induction electromagnetic force.

Optionally, adjacent first touch electrode blocks of the plurality of first touch electrode blocks are spaced apart by a first gap from each other substantially along the second direction; and adjacent first touch electrode blocks of the plurality of first touch electrode blocks in each of the plurality of first touch electrodes are electrically connected together by one of the plurality of first coils.

Optionally, the touch substrate further includes a first bridge layer including a plurality of first bridges, adjacent first touch electrode blocks of the plurality of first touch electrode blocks are connected to each other by one of the plurality of first bridges; and adjacent first touch electrode blocks of the plurality of first touch electrode blocks in each of the plurality of first touch electrodes are electrically connected together by one of the plurality of first coils. Optionally, the touch substrate does not include the first bridge layer, and adjacent first touch electrode blocks of the plurality of first touch electrode blocks in each of the plurality of first touch electrodes are electrically connected together solely by one of the plurality of first coils.

In some embodiments, the touch substrate further includes a fourth touch electrode layer comprising a plurality of fourth touch electrodes. Each of the plurality of fourth touch electrodes is electrically connected to one of the plurality of second coils. The third touch electrode layer and the fourth electrode layer are insulated from the first touch electrode layer and the second touch electrode layer. Optionally, the plurality of fourth touch electrodes are arranged substantially along the second direction, each of the plurality of fourth touch electrodes including a plurality of fourth touch electrode blocks extending substantially along the first direction. Optionally, adjacent fourth touch electrode blocks of the plurality of fourth touch electrode blocks in each of the plurality of fourth touch electrodes are electrically connected together by one of the plurality of second coils.

Optionally, the plurality of first touch electrodes are a plurality of capacitive scanning touch electrodes, and the plurality of fourth touch electrodes are a plurality of capacitive sensing touch electrodes.

Optionally, adjacent fourth touch electrode blocks of the plurality of fourth touch electrode blocks are spaced apart by a second gap from each other substantially along the first direction; and adjacent fourth touch electrode blocks of the plurality of fourth touch electrode blocks in each of the plurality of fourth touch electrodes are electrically connected together by one of the plurality of second coils.

Optionally, the touch substrate further includes a second bridge layer including a plurality of second bridges, adjacent fourth touch electrode blocks of the plurality of fourth touch electrode blocks are connected to each other by one of the plurality of second bridges; and adjacent fourth touch electrode blocks of the plurality of fourth touch electrode blocks in each of the plurality of fourth touch electrodes are electrically connected together by one of the plurality of second coils. Optionally, the touch substrate does not include the second bridge layer, and adjacent fourth touch electrode blocks of the plurality of fourth touch electrode blocks in each of the plurality of fourth touch electrodes are electrically connected together solely by one of the plurality of second coils.

Figure 2:
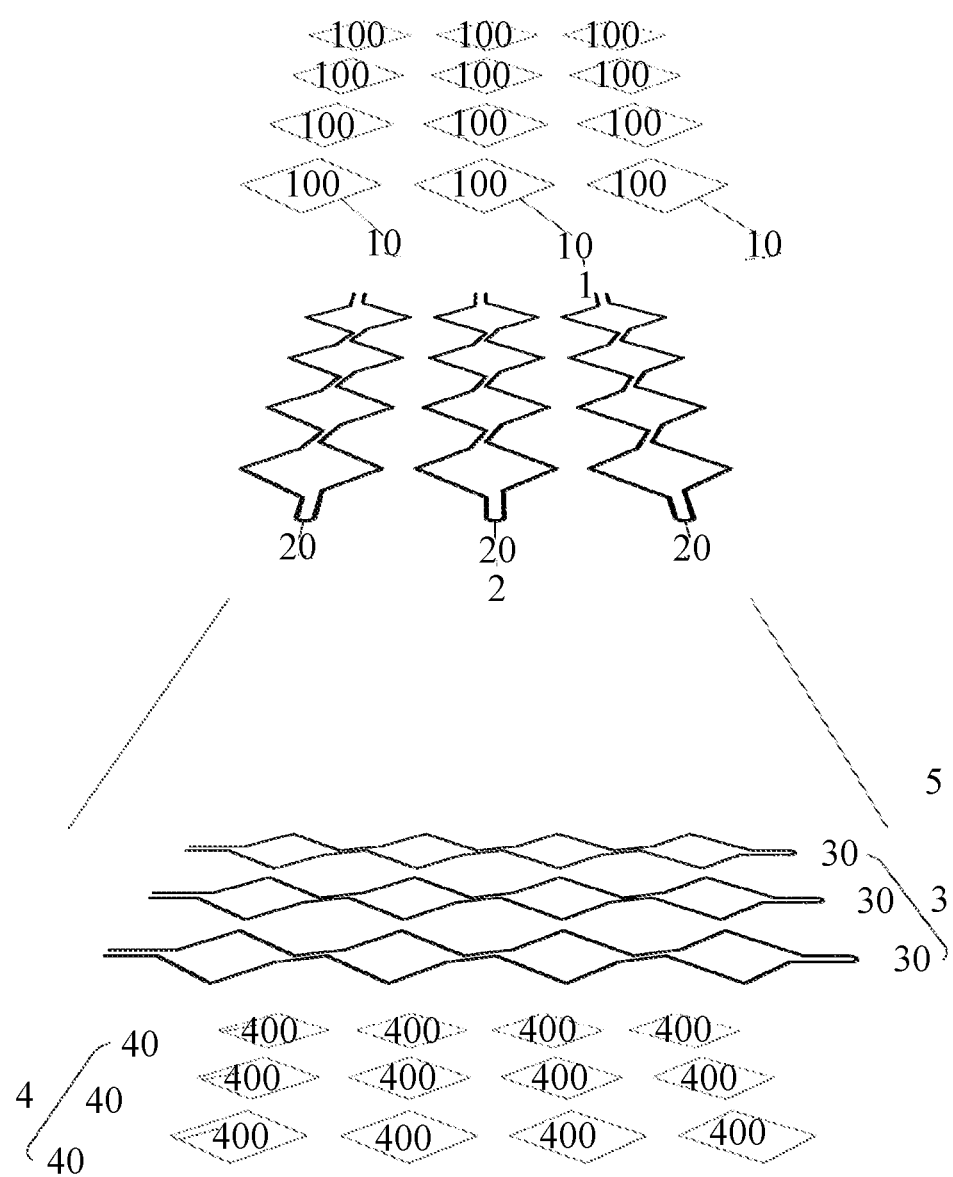
FIG. 2 is a perspective view of the structure of the touch substrate in FIG. 1.

FIG. 1 is a schematic diagram illustrating the structure of a touch substrate in some embodiments according to the present disclosure. FIG. 2 is a perspective view of the structure of the touch substrate in FIG. 1. Referring to FIGS. 1 and 2, the touch substrate in some embodiments includes a base substrate (not shown in FIGS. 1 and 2); a first touch electrode layer 1 on the base substrate and including a plurality of first touch electrodes 10 arranged substantially along a first direction, each of the plurality of first touch electrodes 10 including a plurality of first touch electrode blocks 100 extending substantially along a second direction; a second touch electrode layer 2 including a plurality of first coils 20 arranged substantially along the first direction, each of the plurality of first coils 20 extending substantially along the second direction; a third touch electrode layer 3 including a plurality of second coils 30 arranged substantially along the second direction, each of the plurality of second coils 30 extending substantially along the first direction; a fourth touch electrode layer 4 including a plurality of fourth touch electrodes 40 arranged substantially along the second direction, each of the plurality of fourth touch electrodes 40 including a plurality of fourth touch electrode blocks 400 extending substantially along the first direction; and an insulating layer 5 insulating the first touch electrode layer 1 and the second touch electrode layer 2 from the third touch electrode layer 3 and the fourth touch electrode layer 4.

Figure 3:
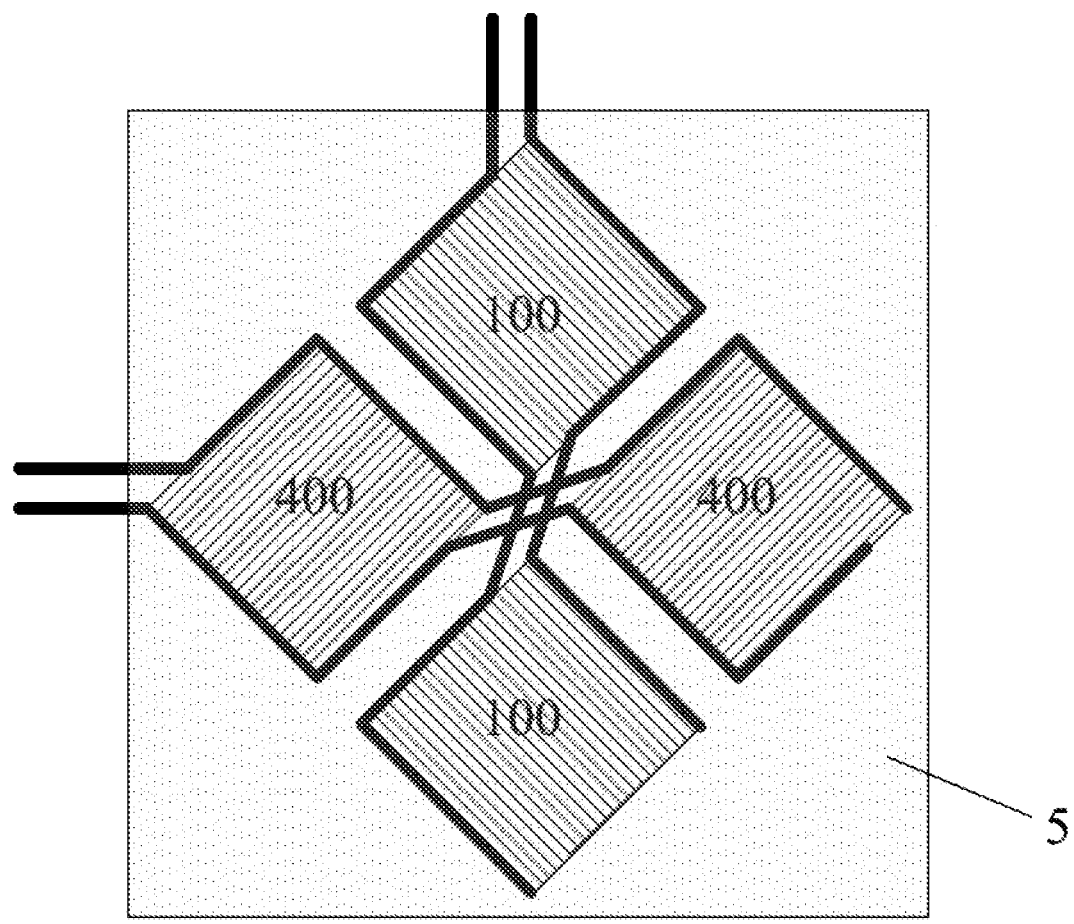
FIG. 3 is a zoom-in view of an area encircled by the dotted lines in FIG. 1.
Figure 4:
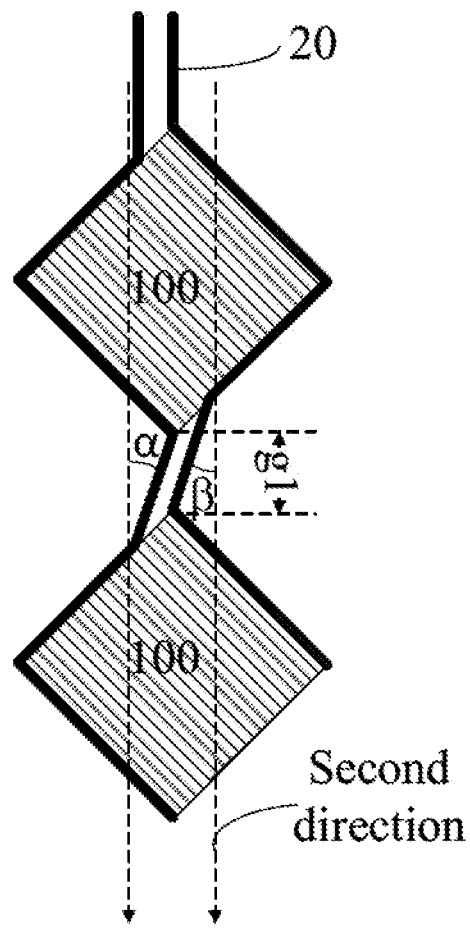
FIG. 4 is a schematic diagram illustrating the structure of a first touch electrode layer and a second touch electrode layer in the zoom-in view of FIG. 2.
Figure 5:
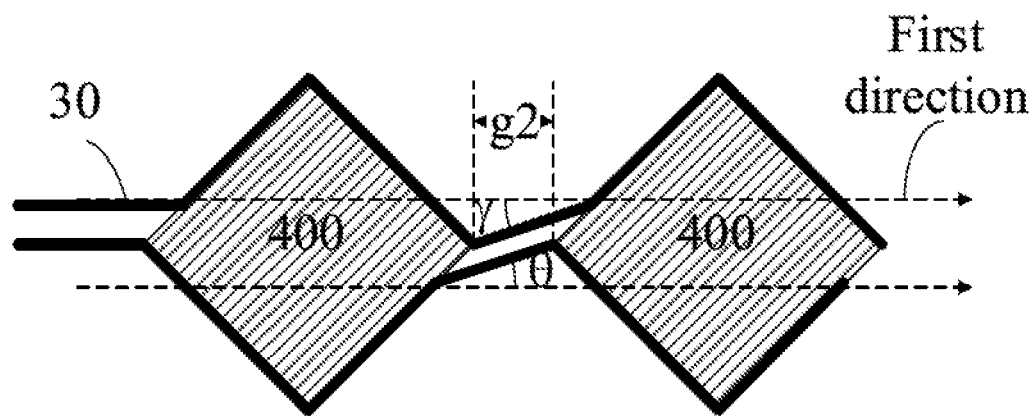
FIG. 5 is a schematic diagram illustrating the structure of a third touch electrode layer and a fourth touch electrode layer in the zoom-in view of FIG. 2.

FIG. 3 is a zoom-in view of an area encircled by the dotted lines in FIG. 1. FIG. 4 is a schematic diagram illustrating the structure of a first touch electrode layer and a second touch electrode layer in the zoom-in view of FIG. 2. FIG. 5 is a schematic diagram illustrating the structure of a third touch electrode layer and a fourth touch electrode layer in the zoom-in view of FIG. 2. Referring to FIG. 4, in some embodiments, adjacent first touch electrode blocks of the plurality of first touch electrode blocks 100 are spaced apart by a first gap from each other substantially along the second direction. Adjacent first touch electrode blocks of the plurality of first touch electrode blocks 100 in each of the plurality of first touch electrodes 10 are electrically connected together by one of the plurality of first coils 20. Referring to FIG. 5, in some embodiments, adjacent fourth touch electrode blocks of the plurality of fourth touch electrode blocks 400 are spaced apart by a second gap from each other substantially along the first direction. Adjacent fourth touch electrode blocks of the plurality of fourth touch electrode blocks 400 in each of the plurality of fourth touch electrodes 40 are electrically connected together by one of the plurality of second coils 30.

Optionally, the touch substrate further includes a first bridge layer including a plurality of first bridges, adjacent first touch electrode blocks of the plurality of first touch electrode blocks 100 are connected to each other by one of the plurality of first bridges; and adjacent first touch electrode blocks of the plurality of first touch electrode blocks 100 in each of the plurality of first touch electrodes 10 are electrically connected together by one of the plurality of first coils 20.

Optionally, the touch substrate further includes a second bridge layer including a plurality of second bridges, adjacent fourth touch electrode blocks of the plurality of fourth touch electrode blocks 400 are connected to each other by one of the plurality of second bridges; and adjacent fourth touch electrode blocks of the plurality of fourth touch electrode blocks 400 in each of the plurality of fourth touch electrodes 40 are electrically connected together by one of the plurality of second coils 30.

Referring to FIG. 1, in some embodiments, the plurality of first coils 20 and the plurality of second coils 30 are a plurality of electromagnetic touch electrodes. Optionally, the plurality of first coils 20 and the plurality of second coils 30 are made of a metal material, e.g., copper, aluminum, gold, and silver. In some embodiments, the plurality of first touch electrodes 10 and the plurality of fourth touch electrode 40 are a plurality of capacitive touch electrodes. In one example, the plurality of first touch electrodes 10 are a plurality of touch scanning touch electrodes, and the plurality of fourth touch electrodes 40 are a plurality of touch sensing touch electrodes. In another example, the plurality of first touch electrodes 10 are a plurality of touch sensing touch electrodes, and the plurality of fourth touch electrodes 40 are a plurality of touch scanning touch electrodes. Optionally, the plurality of first touch electrodes 10 and the plurality of fourth touch electrode 40 are made of a transparent electrode material, e.g., a metal oxide such as indium tin oxide.

By having adjacent first touch electrode blocks electrically connected by one of the plurality of first coils 20, and having adjacent fourth touch electrode blocks electrically connected by one of the plurality of second coils 30, the resistance of the conductive channels of the capacitive touch electrodes (e.g., the conductive channels formed by the plurality of first touch electrodes 10 or by the plurality of fourth touch electrodes 40) is significantly reduced. Accordingly, the plurality of first touch electrode blocks 100 and the plurality of fourth touch electrode blocks 400 can be made thinner, leading to a much-improved light transmittance rate of the touch substrate. Superior display quality can be achieved in a touch control display panel having the present touch substrate. The electromagnetic touch electrodes (e.g., the plurality of first coils 20 and the plurality of second coils 30) enable detection of a touch signal by detecting an induction electromagnetic force, e.g., generated from a touch pen. Thus, the present touch substrate is compatible for use with a touch pen, enabling detection of a fine touch with a high precision.

Moreover, by having each of the plurality of first coils 20 electrically connected to the plurality of first touch electrode blocks 100, and having each of the plurality of second coils 30 electrically connected to the plurality of fourth touch electrode blocks 400, eddy current loss in the plurality of first coils 20 and the plurality of second coils 30 are notably reduced due to the relatively large resistivity (e.g., in a range of approximately 15Ω/□ to approximately 40Ω/□) of the first touch electrode layer 1 and the fourth touch electrode layer 4 (typically made of a material having a relative large resistivity, e.g., a metal oxide such as indium tin oxide).

Referring to FIG. 1, in the display area, each of the plurality of first coils 20 has an outline shape substantially the same as one of the plurality of first touch electrodes 10. For example, wirings of each of the plurality of first coils 20 extend substantially along edges of at least one of the plurality of first touch electrode blocks 100 in the one of the plurality of first touch electrodes 10. Optionally, wirings of each of the plurality of first coils 20 extend substantially along edges of all of the plurality of first touch electrode blocks 100 in the one of the plurality of first touch electrodes 10. Optionally, in the display area, an area encircled by a projection of the wirings of each of the plurality of first coils 20 on the base substrate substantially overlaps with a projection of the one of the plurality of first touch electrodes 10 on the base substrate. As used herein, the term "display area" refers to an area of the display substrate where image is actually displayed. As used herein the term "peripheral area" refers to an area where various circuits and wires are provided to transmit signals to the display substrate.

In some embodiments, the wirings of each of the plurality of first coils 20 is in contact with the edges of at least one of the plurality of first touch electrode blocks 100 in the one of the plurality of first touch electrodes 10. Optionally, the wirings of each of the plurality of first coils 20 is in contact with the edges of all of the plurality of first touch electrode blocks 100 in the one of the plurality of first touch electrodes 10. Optionally, and referring to FIGS. 1 to 3, the wirings of each of the plurality of first coils 20 is in contact with the edges of the plurality of first touch electrode blocks 100 substantially throughout the edges of the plurality of first touch electrode blocks 100. By having this design, the resistance of the plurality of first touch electrodes 10 can be most reduced. Optionally, the wirings of each of the plurality of first coils 20 is in contact with the plurality of first touch electrode blocks 100 at one or more contact points. In one example, the touch substrate includes a first insulating layer between the first touch electrode layer 1 and the second touch electrode layer 2, and the wirings of each of the plurality of first coils 20 is in contact with the plurality of first touch electrode blocks 100 through one or more vias in the first insulating layer, thereby electrically connecting the adjacent first touch electrode blocks of the plurality of first touch electrode blocks 100 in each of the plurality of first touch electrodes 10.

In some embodiments, in the display area, each of the plurality of second coils 30 has an outline shape substantially the same as one of the plurality of fourth touch electrodes 40. For example, wirings of each of the plurality of second coils 30 extend substantially along edges of at least one of the plurality of fourth touch electrode blocks 400 in the one of the plurality of fourth touch electrodes 40. Optionally, wirings of each of the plurality of second coils 30 extend substantially along edges of all of the plurality of fourth touch electrode blocks 400 in the one of the plurality of fourth touch electrodes 40. Optionally, in the display area, an area encircled by a projection of the wirings of each of the plurality of second coils 30 on the base substrate substantially overlaps with a projection of the one of the plurality of fourth touch electrodes 40 on the base substrate.

In some embodiments, the wirings of each of the plurality of second coils 30 is in contact with the edges of at least one of the plurality of fourth touch electrode blocks 400 in the one of the plurality of fourth touch electrodes 40. Optionally, the wirings of each of the plurality of second coils 30 is in contact with the edges of all of the plurality of fourth touch electrode blocks 400 in the one of the plurality of fourth touch electrodes 40. Optionally, and referring to FIGS. 1, 2, and 4, the wirings of each of the plurality of second coils 30 is in contact with the edges of the plurality of fourth touch electrode blocks 400 substantially throughout the edges of the plurality of fourth touch electrode blocks 400. By having this design, the resistance of the plurality of fourth touch electrodes 40 can be most reduced. Optionally, the wirings of each of the plurality of second coils 30 is in contact with the plurality of fourth touch electrode blocks 400 at one or more contact points. In one example, the touch substrate includes a second insulating layer between the fourth electrode layer 4 and the third touch electrode layer 3, and the wirings of each of the plurality of second coils 30 is in contact with the plurality of fourth touch electrode blocks 400 through one or more vias in the second insulating layer, thereby electrically connecting the adjacent fourth touch electrode blocks of the plurality of fourth touch electrode blocks 400 in each of the plurality of fourth touch electrodes 40.

In some embodiments, the wirings of each of the plurality of first coils 20 in a region between adjacent first touch electrode blocks of the plurality of first touch electrode blocks 100 are at a tilted angle with respect to the second direction. Referring to FIG. 4, in some embodiments, adjacent first touch electrode blocks of the plurality of first touch electrode blocks 100 are spaced apart by a first gap g1 from each other substantially along the second direction. The wirings of each of the plurality of first coils 20 in a region corresponding to the first gap g1 are at a tilted angle with respect to the second direction. As shown in FIG. 4, one of the wirings in the region corresponding to the first gap g1 is at a tilted angle of α with respect to the second direction, and the other one of the wirings in the region corresponding to the first gap g1 is at a tilted angle of β with respect to the second direction. By having this design, Moiré patterns due to interference between linear stretches of the wirings and the display module can be minimized or eliminated.

In some embodiments, the wirings of each of the plurality of second coils 30 in a region between adjacent fourth touch electrode blocks of the plurality of fourth touch electrode blocks 400 are at a tilted angle with respect to the first direction. Referring to FIG. 5, in some embodiments, adjacent fourth touch electrode blocks of the plurality of fourth touch electrode blocks 400 are spaced apart by a second gap g2 from each other substantially along the first direction. The wirings of each of the plurality of second coils 30 in a region corresponding to the second gap g2 are at a tilted angle with respect to the first direction. As shown in FIG. 5, one of the wirings in the region corresponding to the second gap g2 is at a tilted angle of γ with respect to the first direction, and the other one of the wirings in the region corresponding to the second gap g2 is at a tilted angle of θ with respect to the first direction. By having this design, Moiré patterns due to interference between linear stretches of the wirings and the display module can be minimized or eliminated.

As used herein, the term tilted angle refers to an included angle between a wiring and a direction that is larger than zero degree, for example, a non-zero included angle between a wiring of one of the plurality of first coils in a region between adjacent first touch electrode blocks of the plurality of first touch electrode blocks and the second direction, or a non-zero included angle between a wiring of one of the plurality of second coils in a region between adjacent fourth touch electrode blocks of the plurality of fourth touch electrode blocks and the first direction. Optionally, the included angle is not 90 degrees. Optionally, the included angle is in a range of approximately 15 degrees to approximately 75 degrees. Optionally, the included angle is in a range of approximately 25 degrees to approximately 65 degrees. Optionally, the included angle is in a range of approximately 30 degrees to approximately 60 degrees. Optionally, the included angle is in a range of approximately 35 degrees to approximately 55 degrees. Optionally, the included angle is in a range of approximately 40 degrees to approximately 50 degrees. Optionally, the included angle is in a range of approximately 42.5 degrees to approximately 47.5 degrees. Optionally, the included angle is approximately 45 degrees.

In some embodiments, an included angle between the first direction and any wirings of the plurality of first coils 20 is in a range of approximately 15 degrees to approximately 75 degrees, e.g., approximately 25 degrees to approximately 65 degrees, approximately 30 degrees to approximately 60 degrees, approximately 35 degrees to approximately 55 degrees, approximately 40 degrees to approximately 50 degrees, and approximately 42.5 degrees to approximately 47.5 degrees. Optionally, the included angle between the first direction and any wirings of the plurality of first coils 20 is approximately 45 degrees. In some embodiments, an included angle between the second direction and any wirings of the plurality of first coils 20 is in a range of approximately 15 degrees to approximately 75 degrees, e.g., approximately 25 degrees to approximately 65 degrees, approximately 30 degrees to approximately 60 degrees, approximately 35 degrees to approximately 55 degrees, approximately 40 degrees to approximately 50 degrees, and approximately 42.5 degrees to approximately 47.5 degrees. Optionally, the included angle between the second direction and any wirings of the plurality of first coils 20 is approximately 45 degrees. In some embodiments, an included angle between the first direction and any wirings of the plurality of second coils 30 is in a range of approximately 15 degrees to approximately 75 degrees, e.g., approximately 25 degrees to approximately 65 degrees, approximately 30 degrees to approximately 60 degrees, approximately 35 degrees to approximately 55 degrees, approximately 40 degrees to approximately 50 degrees, and approximately 42.5 degrees to approximately 47.5 degrees. Optionally, the included angle between the first direction and any wirings of the plurality of second coils 30 is approximately 45 degrees. In some embodiments, an included angle between the second direction and any wirings of the plurality of second coils 30 is in a range of approximately 15 degrees to approximately 75 degrees, e.g., approximately 25 degrees to approximately 65 degrees, approximately 30 degrees to approximately 60 degrees, approximately 35 degrees to approximately 55 degrees, approximately 40 degrees to approximately 50 degrees, and approximately 42.5 degrees to approximately 47.5 degrees. Optionally, the included angle between the second direction and any wirings of the plurality of second coils 30 is approximately 45 degrees.

In some embodiments, the plurality of first coils 20 and the plurality of second coils 30 cross over each other, forming a plurality of intersections. Optionally, in each of the plurality of intersections, wiring of one of the plurality of first coils 20 are not perpendicular to wirings of one of the plurality of second coils 30. Optionally, an included angle between any wirings of the one of the plurality of first coils 20 and any wirings of the one of the plurality of second coils 30 in each of the plurality of intersections is not 90 degrees, e.g., less than or greater than 90 degrees. Optionally, an included angle between any wirings of the one of the plurality of first coils 20 and any wirings of the one of the plurality of second coils 30 in each of the plurality of intersections is in a range of approximately 15 degrees to approximately 75 degrees.

Figure 6:
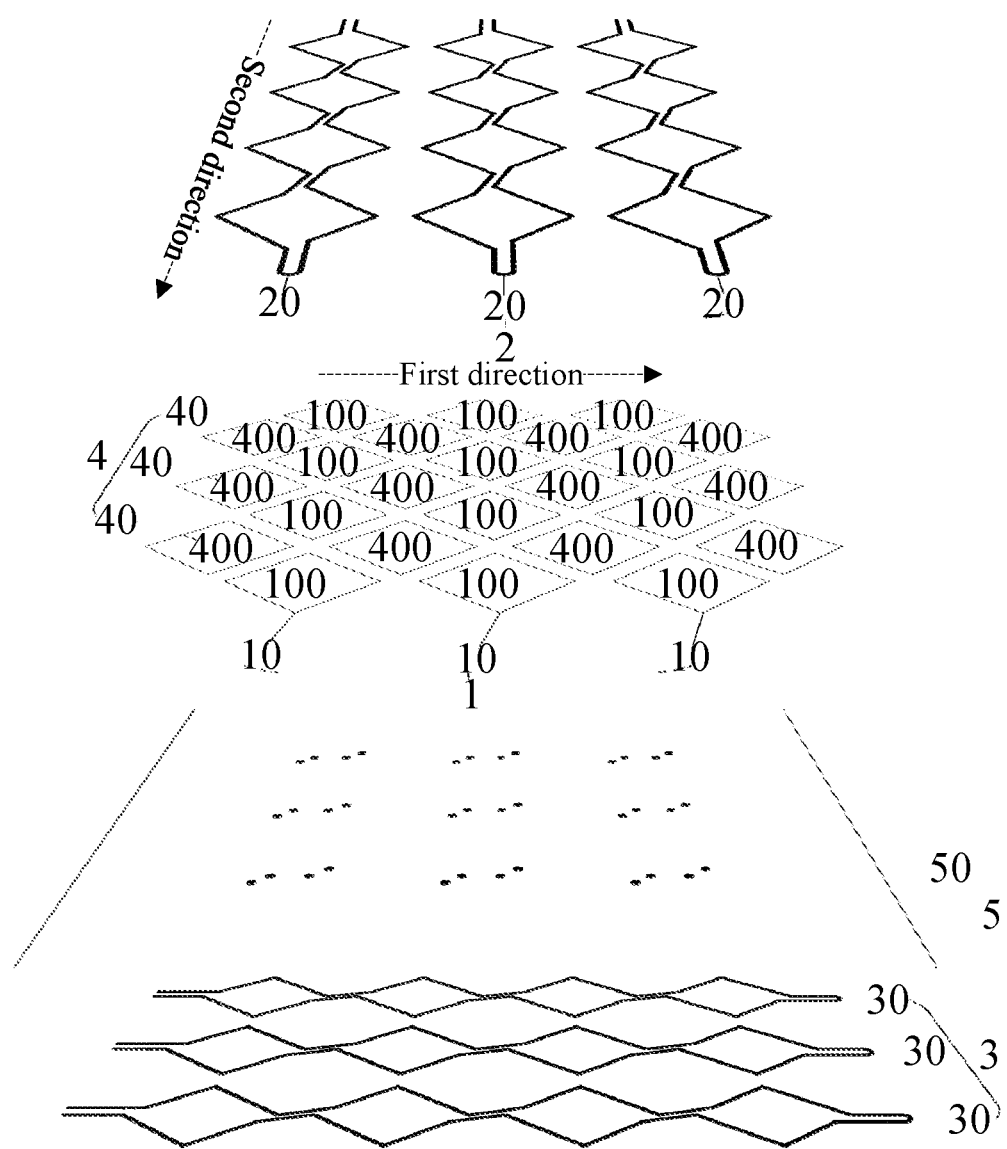
FIG. 6 is a perspective view of the structure of a touch substrate in some embodiments according to the present disclosure.

In some embodiments, the capacitive touch electrodes are in a same layer or on a same horizontal plane. FIG. 6 is a perspective view of the structure of a touch substrate in some embodiments according to the present disclosure. Referring to FIG. 6, the first touch electrode layer 1 and the fourth electrode layer 4 are in a same layer, e.g., made of a same material and in a single patterning process. Optionally, the first touch electrode layer 1 and the fourth electrode layer 4 are on a same horizontal plane, but patterned separately. The touch substrate in FIG. 6 includes a first touch electrode layer 1 including a plurality of first touch electrodes 10 arranged substantially along a first direction, each of the plurality of first touch electrodes 10 including a plurality of first touch electrode blocks 100 extending substantially along a second direction; and a fourth touch electrode layer 4 including a plurality of fourth touch electrodes 40 arranged substantially along the second direction, each of the plurality of fourth touch electrodes 40 including a plurality of fourth touch electrode blocks 400 extending substantially along the first direction; and the first touch electrode layer 1 and the fourth electrode layer 4 are in a same layer.

As used herein, the term "same layer" refers to the relationship between the layers simultaneously formed in the same step. In one example, the plurality of first touch electrodes 10 and the plurality of fourth touch electrodes 40 are in a same layer when they are formed as a result of one or more steps of a same patterning process performed in a same layer of material. In another example, the plurality of first touch electrodes 10 and the plurality of fourth touch electrodes 40 can be formed in a same layer by simultaneously performing the step of forming the plurality of first touch electrodes 10 and the step of forming the plurality of fourth touch electrodes 40. The term "same layer" does not always mean that the thickness of the layer or the height of the layer in a cross-sectional view is the same.

The touch substrate in FIG. 6 further includes a second touch electrode layer 2 on the first touch electrode layer 1 and the fourth electrode layer 4. The second touch electrode layer 2 includes a plurality of first coils 20 arranged substantially along the first direction, each of the plurality of first coils 20 extending substantially along the second direction. Adjacent first touch electrode blocks of the plurality of first touch electrode blocks 100 in each of the plurality of first touch electrodes 10 are electrically connected together by one of the plurality of first coils 20. The touch substrate in FIG. 6 further includes an insulating layer 5 on a side of the first touch electrode layer 1 and the fourth electrode layer 4 distal to the second touch electrode layer 2; and a third touch electrode layer 3 including a plurality of second coils 30 arranged substantially along the second direction, each of the plurality of second coils 30 extending substantially along the first direction. The touch substrate further includes a plurality of vias 50 extending through the insulating layer 5, each of the plurality of second coils 30 are electrically connected, through multiple vias of the plurality of vias 50, to the adjacent fourth touch electrode blocks of the plurality of fourth touch electrode blocks 400 in one of the plurality of fourth touch electrodes 40, thereby connected the adjacent fourth touch electrode blocks.

Optionally, the plurality of first touch electrodes 10 and the plurality of fourth touch electrodes 40 are a plurality of capacitive touch electrodes. Optionally, the plurality of first coils 20 and the plurality of second coils 30 are a plurality of electromagnetic touch electrodes. Optionally, the plurality of first touch electrodes 10 are a plurality of touch scanning touch electrodes, and the plurality of fourth touch electrodes 40 are a plurality of touch sensing touch electrodes.

Optionally, in the display area, each of the plurality of first coils 20 has an outline shape substantially the same as one of the plurality of first touch electrodes 10. Optionally, wirings of each of the plurality of first coils 20 extends substantially along edges of the plurality of first touch electrode blocks 100 in the one of the plurality of first touch electrodes. Optionally, wirings of each of the plurality of first coils 20 is in contact with the edges of at least one of the plurality of first touch electrode blocks 100 in the one of the plurality of first touch electrodes 10. Optionally, wirings of each of the plurality of first coils 20 is in contact with the edges of all of the plurality of first touch electrode blocks 100 in the one of the plurality of first touch electrodes 10. Optionally, in the display area, an area encircled by a projection of wirings of each of the plurality of first coils 20 on the base substrate substantially overlaps with a projection of the one of the plurality of first touch electrodes 10 on the base substrate. Optionally, wirings of each of the plurality of first coils 20 in a region between adjacent first touch electrode blocks of the plurality of first touch electrode blocks 100 are at a tilted angle with respect to the second direction.

Optionally, in the display area, each of the plurality of second coils 30 has an outline shape substantially the same as one of the plurality of fourth touch electrodes 40. Optionally, in the display area, an area encircled by a projection of wirings of each of the plurality of second coils 30 on the base substrate substantially overlaps with a projection of the one of the plurality of fourth touch electrodes 40 on the base substrate. Optionally, wirings of each of the plurality of second coils 30 in a region between adjacent fourth touch electrode blocks of the plurality of fourth touch electrode blocks 400 are at a tilted angle with respect to the first direction.

In some embodiments, the touch substrate is a self-capacitive type touch substrate. The touch substrate in some embodiments includes a base substrate, a third touch electrode layer on the base substrate, an insulating layer on a side of the third touch electrode layer distal to the base substrate, a first touch electrode layer on a side of the insulating layer distal to the third touch electrode layer, and a second touch electrode layer on a side of the first touch electrode layer distal to the insulating layer. The first touch electrode layer includes a plurality of first touch electrodes arranged substantially along a first direction, each of the plurality of first touch electrodes including a plurality of first touch electrode blocks extending substantially along a second direction. Optionally, the first touch electrode layer is a self-capacitive touch electrode layer. The second touch electrode layer includes a plurality of first coils arranged substantially along the first direction, each of the plurality of first coils extending substantially along the second direction. The third touch electrode layer includes a plurality of second coils arranged substantially along a third direction, each of the plurality of second coils extending substantially along a fourth direction. Adjacent first touch electrode blocks of the plurality of first touch electrode blocks in each of the plurality of first touch electrodes are electrically connected together by one of the plurality of first coils. The third touch electrode layer is insulated from the first touch electrode layer and the second touch electrode layer by the insulating layer. Optionally, the third direction is substantially parallel to the second direction. Optionally, the fourth direction is substantially parallel to the first direction.

Each of the plurality of first touch electrode blocks 100 and the plurality of fourth touch electrode blocks 400 may be made of any appropriate shape. Examples of appropriate shapes include, but are not limited to, a rectangular shape, a square shape, a rod shape, a bar shape, an elliptical shape, a circle shape, a diamond shape, a parallelogram shape, a rhombus shape, a hexagon shape, an oval shape, a polygon shape, or an irregular shape.

In some embodiments, and referring to FIG. 1, each of the plurality of first coils 20 has an overall U-shape structure. A first terminal of each of the plurality of first coils 20 is closed, and a second terminal of each of the plurality of first coils 20 is open. The wire of the U-shape structure has a first end 20a and a second end 20b. In some embodiments, the first end 20a is provided with a ground voltage, and the second end 20b is connected to a data selector, thereby forming a current loop. When a touch pen (e.g., an electromagnetic pen) touches a touch control display panel having the present touch substrate, magnetic flux in the current loop at the touch position increases, resulting in an increased induced electromotive force on the electrode wire. Similarly, in some embodiments, each of the plurality of second coils 30 has an overall U-shape structure. A first terminal of each of the plurality of second coils 30 is closed, and a second terminal of each of the plurality of second coils 30 is open. The wire of the U-shape structure has a third end 30a and a fourth end 30b. In some embodiments, the third end 30a is provided with a ground voltage, and the fourth end 30b is connected to a data selector, thereby forming a current loop. When a touch pen (e.g., an electromagnetic pen) touches a touch control display panel having the present touch substrate, magnetic flux in the current loop at the touch position increases, resulting in an increased induced electromotive force on the electrode wire. By having the plurality of first coils 20 and the plurality of second coils 30, X- and Y-coordinates of the touch position can be determined.

In some embodiments, the data selector includes a driving port and a sensing port. The second end 20b of each of the plurality of first coils 20 is connected to the data selector. The connection may be switched between the driving port and the sensing port. In some embodiments, the fourth end 30b of each of the plurality of second coils 30 is connected to the data selector, the connection may be switched between the driving port and the sensing port. The data selectors are connected to an integrated circuit which is configured to provide a plurality of electromagnetic touch scanning signals to the plurality of first coils 20 and the plurality of second coils 30.

In some embodiments, in an electromagnetic touch mode, the second ends 20b of the plurality of first coils 20 are connected to corresponding driving ports in the data selector one by one to respectively receiving electromagnetic touch scanning signals. Once one of the plurality of first coils 20 is loaded with an electromagnetic touch scanning signal, the second end 20b of the one of the plurality of first coils 20 is switched to be connected with a corresponding sensing port in the data selector, thereby detecting a sensing signal outputted from the sensing port. Similarly, in some embodiments, the fourth ends 30b of the plurality of second coils 30 in the electromagnetic touch mode are connected to corresponding driving ports in the data selector one by one to respectively receiving electromagnetic touch scanning signals. Once one of the plurality of second coils 30 is loaded with an electromagnetic touch scanning signal, the fourth end 30b of the one of the plurality of second coils 30 is switched to be connected with a corresponding sensing port in the data selector, thereby detecting a sensing signal outputted from the sensing port. A touch position may be determined by detecting sensing signals from sensing ports connected with the plurality of first coils 20 and sensing ports connected with the plurality of second coils 30.

In another aspect, the present disclosure provides a method of fabricating a touch substrate. In some embodiments, the method includes forming a first touch electrode layer, a second touch electrode layer, and a third touch electrode layer on a base substrate. Optionally, the step of forming the first touch electrode layer includes forming a plurality of first touch electrodes. Optionally, the step of forming the second touch electrode layer includes forming a plurality of first coils. Optionally, the step of forming the third touch electrode layer includes forming a plurality of second coils. Each of the plurality of first touch electrodes is formed to be electrically connected to one of the plurality of first coils. The third touch electrode layer is formed to be insulated from the first touch electrode layer and the second touch electrode layer.

Optionally, the plurality of first touch electrodes are a plurality of capacitive touch electrodes; and the plurality of first coils and the plurality of second coils are a plurality of electromagnetic touch electrodes.

Optionally, in the display area, each of the plurality of first coils is formed to have an outline shape substantially the same as one of the plurality of first touch electrodes.

Optionally, the step of forming the first touch electrode layer includes forming a plurality of first touch electrodes arranged substantially along a first direction, each of the plurality of first touch electrodes is formed to comprise a plurality of first touch electrode blocks extending substantially along a second direction. Optionally, the step of forming the second touch electrode layer includes forming a plurality of first coils arranged substantially along the first direction, each of the plurality of first coils extending substantially along the second direction. Optionally, the step of forming the third touch electrode layer includes forming a plurality of second coils arranged substantially along a third direction, each of the plurality of second coils extending substantially along a fourth direction. Adjacent first touch electrode blocks of the plurality of first touch electrode blocks in each of the plurality of first touch electrodes are formed to be electrically connected together by one of the plurality of first coils. Optionally, the third direction is substantially parallel to the second direction. Optionally, the fourth direction is substantially parallel to the first direction.

Optionally, the step of forming the plurality of first coils includes forming wirings of each of the plurality of first coils to extend substantially along edges of at least one of the plurality of first touch electrode blocks in the one of the plurality of first touch electrodes. Optionally, the step of forming the plurality of first coils includes forming wirings of each of the plurality of first coils to extend substantially along edges of all of the plurality of first touch electrode blocks in the one of the plurality of first touch electrodes. Optionally, the step of forming the plurality of first coils includes forming wirings of each of the plurality of first coils to be in contact with the edges of at least one of the plurality of first touch electrode blocks in the one of the plurality of first touch electrodes. Optionally, the step of forming the plurality of first coils includes forming wirings of each of the plurality of first coils to be in contact with the edges of all of the plurality of first touch electrode blocks in the one of the plurality of first touch electrodes. Optionally, in the display area, the plurality of first coils are formed so that an area encircled by a projection of wirings of each of the plurality of first coils on the base substrate substantially overlaps with a projection of the one of the plurality of first touch electrodes on the base substrate. Optionally, the step of forming the plurality of first coils includes forming wirings of each of the plurality of first coils in a region between adjacent first touch electrode blocks of the plurality of first touch electrode blocks to be at a tilted angle with respect to the second direction.

In some embodiments, the method further includes forming fourth touch electrode layer having a plurality of fourth touch electrodes. Optionally, each of the plurality of fourth touch electrodes is formed to be electrically connected to one of the plurality of second coils. Optionally, the third touch electrode layer and the fourth electrode layer are formed to be insulated from the first touch electrode layer and the second touch electrode layer.

Optionally, the plurality of first touch electrodes area plurality of touch scanning touch electrodes, and the plurality of fourth touch electrodes are a plurality of touch sensing touch electrodes.

Optionally, in the display area, each of the plurality of second coils is formed to have an outline shape substantially the same as one of the plurality of fourth touch electrodes.

Optionally, the step of forming the fourth touch electrode layer includes forming a plurality of fourth touch electrodes substantially along the second direction, each of the plurality of fourth touch electrodes having a plurality of fourth touch electrode blocks extending substantially along the first direction. Optionally, adjacent fourth touch electrode blocks of the plurality of fourth touch electrode blocks in each of the plurality of fourth touch electrodes are formed to be electrically connected together by one of the plurality of second coils.

Optionally, the step of forming the plurality of second coils includes forming wirings of each of the plurality of second coils to extend substantially along edges of at least one of the plurality of fourth touch electrode blocks in the one of the plurality of fourth touch electrodes. Optionally, the step of forming the plurality of second coils includes forming wirings of each of the plurality of second coils to extend substantially along edges of all of the plurality of fourth touch electrode blocks in the one of the plurality of fourth touch electrodes. Optionally, the step of forming the plurality of second coils includes forming wirings of each of the plurality of second coils to be in contact with the edges of at least one of the plurality of fourth touch electrode blocks in the one of the plurality of fourth touch electrodes. Optionally, the step of forming the plurality of second coils includes forming wirings of each of the plurality of second coils to be in contact with the edges of all of the plurality of fourth touch electrode blocks in the one of the plurality of fourth touch electrodes. Optionally, in the display area, the plurality of second coils are formed so that an area encircled by a projection of the wirings of each of the plurality of second coils on the base substrate substantially overlaps with a projection of the one of the plurality of fourth touch electrodes on the base substrate. Optionally, the step of forming the plurality of second coils includes forming wirings of each of the plurality of second coils in a region between adjacent fourth touch electrode blocks of the plurality of fourth touch electrode blocks to be at a tilted angle with respect to the first direction.

In some embodiments, the method further includes forming an insulating layer between the second touch electrode layer and the third touch electrode layer. In some embodiments, the method includes forming the first touch electrode layer and the fourth touch electrode layer in a same patterning process. Optionally, the method includes forming the first touch electrode layer and the fourth touch electrode layer in a same layer. Optionally, the method further includes forming comprises a plurality of vias extending through the insulating layer. Optionally, the plurality of vias are formed so that each of the plurality of second coils are electrically connected to the adjacent fourth touch electrode blocks of the plurality of fourth touch electrode blocks in one of the plurality of fourth touch electrodes, thereby connected the adjacent fourth touch electrode blocks.

In another aspect, the present disclosure further provides a touch panel. In some embodiments, the touch panel includes a base substrate; a first touch electrode layer on the base substrate and including a plurality of first touch electrodes; a second touch electrode layer comprising a plurality of first coils; and a third touch electrode layer including a plurality of second coils. Each of the plurality of first touch electrodes is electrically connected to one of the plurality of first coils. The first touch electrode layer and the second touch electrode layer are insulated from the third touch electrode layer.

In another aspect, the present disclosure provides a touch control display panel having a touch substrate described herein or fabricated by a method described herein. Optionally, the touch control display panel is an on-cell type touch control display panel. Optionally, the touch control display panel is an add-on type touch panel, e.g., a one-glass-solution type touch panel or a glass-film-film type touch panel.

Figure 7:
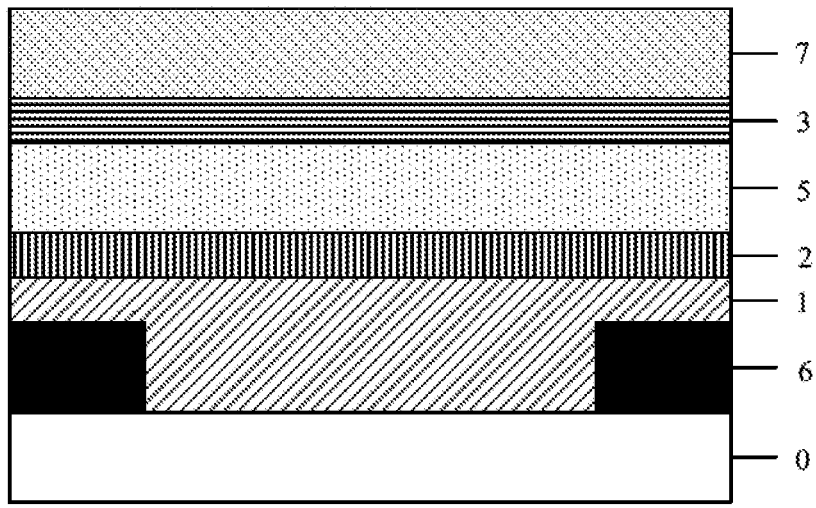
FIG. 7 is a schematic diagram illustrating the structure of a touch control display panel in some embodiments according to the present disclosure.

FIG. 7 is a schematic diagram illustrating the structure of a touch control display panel in some embodiments according to the present disclosure. Referring to FIG. 7, the touch control display panel is a one-glass-solution type touch control display panel. FIG. 7 shows a touch panel portion of the touch control display panel, which can be attached to a display module of the touch control display panel. The touch control display panel in some embodiments includes a base substrate 0, a black matrix layer 6 on the base substrate 0 in a peripheral area of the touch control display panel, a first touch electrode layer 1 on the base substrate 0 in a display area of the touch control display panel, a second touch electrode layer 2 on a side of the first touch electrode layer 1 distal to the base substrate 0, an insulating layer 5 on a side of the second touch electrode layer 2 distal to the first touch electrode layer 1, a third touch electrode layer 3 on a side of the insulating layer 5 distal to the second touch electrode layer 2, and a passivation layer 7 on a side of the third touch electrode layer 3 distal to the insulating layer 5. As discussed above, in some embodiments, the first touch electrode layer 1 is a capacitive touch electrode layer, and the second touch electrode layer 2 and the third touch electrode layer 3 are electromagnetic touch electrode layers.

Optionally, the touch panel is a self-capacitive type touch panel, and the first touch electrode layer 1 is a self-capacitive type touch electrode layer. Optionally, the first touch electrode layer 1 includes a plurality of first touch electrodes. Optionally, the second touch electrode layer 2 includes a plurality of first coils. Optionally, the third touch electrode layer 3 includes a plurality of second coils. Optionally, each of the plurality of first touch electrodes is electrically connected to one of the plurality of first coils. Optionally, the third touch electrode layer 3 is insulated from the first touch electrode layer 1 and the second touch electrode layer 2.

Optionally, the touch panel is a mutual capacitive type touch panel, and the first touch electrode layer 1 is a mutual capacitive type touch electrode layer. Optionally, the touch panel further includes a fourth touch electrode layer (not explicitly shown in FIG. 7). Optionally, the fourth touch electrode layer includes a plurality of fourth touch electrodes. Optionally, the plurality of first touch electrodes are a plurality of touch scanning touch electrodes, and the plurality of fourth touch electrodes are a plurality of touch sensing touch electrodes. Optionally, the first touch electrode layer 1 and the fourth touch electrode layer are in a same layer. Optionally, the first touch electrode layer 1 and the fourth touch electrode layer are substantially on a same horizontal plane.

Optionally, adjacent first touch electrode blocks of the plurality of first touch electrode blocks in each of the plurality of first touch electrodes are electrically connected together by one of the plurality of first coils. Optionally, adjacent fourth touch electrode blocks of the plurality of fourth touch electrode blocks in each of the plurality of fourth touch electrodes are electrically connected together by one of the plurality of second coils. Optionally, the insulating layer 5 includes a plurality of vias extending through the insulating layer 5, and adjacent fourth touch electrode blocks of the plurality of fourth touch electrode blocks in each of the plurality of fourth touch electrodes are electrically connected together by one of the plurality of second coils through multiple vias of the plurality of vias extending through the insulating layer 5.

Figure 8:
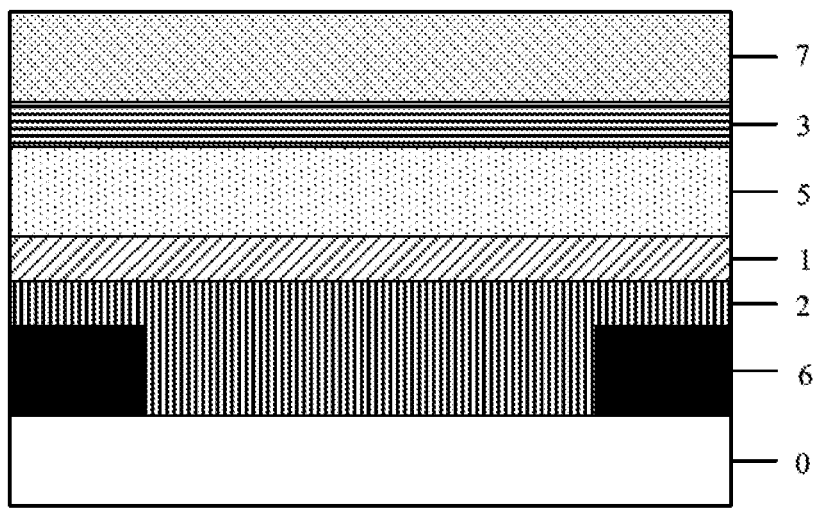
FIG. 8 is a schematic diagram illustrating the structure of a touch control display panel in some embodiments according to the present disclosure.

FIG. 8 is a schematic diagram illustrating the structure of a touch control display panel in some embodiments according to the present disclosure. The touch control display panel in FIG. 8 has a structure similar to that of the touch control display panel in FIG. 7 except that the positions of the first touch electrode layer 1 and the second touch electrode layer 2 are reversed. Referring to FIG. 8, the touch control display panel in some embodiments includes a base substrate 0, a black matrix layer 6 on the base substrate 0 in a peripheral area of the touch control display panel, a second touch electrode layer 2 on the base substrate 0 in a display area of the touch control display panel, a first touch electrode layer 1 on a side of the second touch electrode layer 2 distal to the base substrate 0, an insulating layer 5 on a side of the first touch electrode layer 1 distal to the second touch electrode layer 2, a third touch electrode layer 3 on a side of the insulating layer 5 distal to the first touch electrode layer 1, and a passivation layer 7 on a side of the third touch electrode layer 3 distal to the insulating layer 5. Optionally, the first touch electrode layer 1 is a capacitive touch electrode layer, and the second touch electrode layer 2 and the third touch electrode layer 3 are electromagnetic touch electrode layers. Optionally, the touch control display panel further includes a fourth touch electrode layer (not explicitly shown in FIG. 8). Optionally, the fourth touch electrode layer and the first touch electrode layer 1 are in a same layer.

Figure 9:
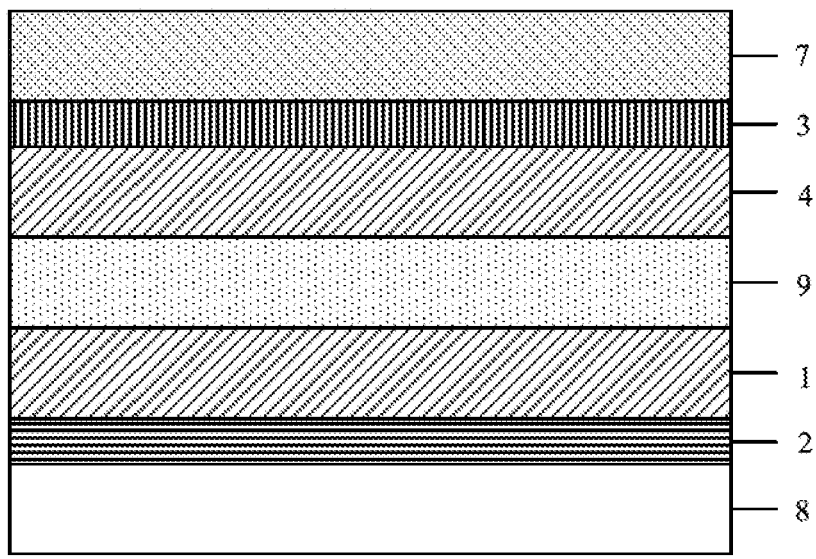
FIG. 9 is a schematic diagram illustrating the structure of a touch control display panel in some embodiments according to the present disclosure.

FIG. 9 is a schematic diagram illustrating the structure of a touch control display panel in some embodiments according to the present disclosure. Referring to FIG. 9, the touch control display panel is an on-cell touch control display panel. The touch control display panel in some embodiments includes an overcoat layer 8, a second touch electrode layer 2 on the overcoat layer 8, a first touch electrode layer 1 on a side of the second touch electrode layer 2 distal to the overcoat layer 8, a counter substrate 9 (e.g., a color filter substrate) of the touch control display panel on a side of the first touch electrode layer 1 distal to the second touch electrode layer 2, a fourth electrode layer 4 on a side of the counter substrate 9 distal to the first touch electrode layer 1, a third touch electrode layer 3 on a side of the fourth electrode layer 4 distal to the counter substrate 9, and a passivation layer 7 on a side of the third touch electrode layer 3 distal to the fourth electrode layer 4. As discussed above, in some embodiments, the first touch electrode layer 1 and the fourth electrode layer 4 are capacitive touch electrode layers, and the second touch electrode layer 2 and the third touch electrode layer 3 are electromagnetic touch electrode layers.

Optionally, the first touch electrode layer 1 includes a plurality of first touch electrodes. Optionally, the fourth touch electrode layer 4 includes a plurality of fourth touch electrodes. Optionally, the second touch electrode layer 2 includes a plurality of first coils. Optionally, the third touch electrode layer 3 includes a plurality of second coils. Optionally, each of the plurality of first touch electrodes is electrically connected to one of the plurality of first coils. Optionally, each of the plurality of fourth touch electrodes is electrically connected to one of the plurality of second coils. Optionally, the third touch electrode layer 3 and the fourth electrode layer 4 are insulated from the first touch electrode layer 1 and the second touch electrode layer 2. Optionally, the plurality of first touch electrodes are a plurality of touch scanning touch electrodes, and the plurality of fourth touch electrodes are a plurality of touch sensing touch electrodes.

Optionally, adjacent first touch electrode blocks of the plurality of first touch electrode blocks in each of the plurality of first touch electrodes are electrically connected together by one of the plurality of first coils. Optionally, adjacent fourth touch electrode blocks of the plurality of fourth touch electrode blocks in each of the plurality of fourth touch electrodes are electrically connected together by one of the plurality of second coils.

Figure 10:
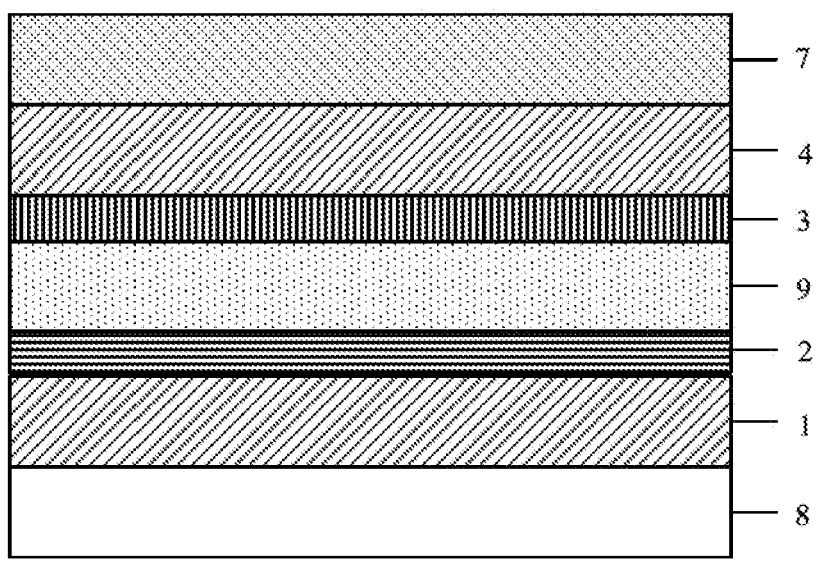
FIG. 10 is a schematic diagram illustrating the structure of a touch control display panel in some embodiments according to the present disclosure.

FIG. 10 is a schematic diagram illustrating the structure of a touch control display panel in some embodiments according to the present disclosure. The touch control display panel in FIG. 10 has a structure similar to that of the touch control display panel in FIG. 9 except that the positions of the first touch electrode layer 1 and the second touch electrode layer 2 are reversed, and the positions of the third touch electrode layer 3 and the fourth touch electrode layer 4 are reversed. Referring to FIG. 10, the touch control display panel in some embodiments includes an overcoat layer 8, a first touch electrode layer 1 on the overcoat layer 8, a second touch electrode layer 2 on a side of the first touch electrode layer 1 distal to the overcoat layer 8, a counter substrate 9 (e.g., a color filter substrate) of the touch control display panel on a side of the second touch electrode layer 2 distal to the first touch electrode layer 1, a third touch electrode layer 3 on a side of the counter substrate 9 distal to the second touch electrode layer 2, a fourth electrode layer 4 on a side of the third touch electrode layer 3 distal to the counter substrate 9, and a passivation layer 7 on a side of the fourth electrode layer 4 distal to the third touch electrode layer 3.

In another aspect, the present disclosure provides a touch control display apparatus having a touch control display panel described herein. Examples of appropriate display apparatuses include, but are not limited to, an electronic paper, a mobile phone, a tablet computer, a television, a monitor, a notebook computer, a digital album, a GPS, etc. Optionally, the display apparatus is an organic light emitting diode display apparatus. Optionally, the display apparatus is a liquid crystal display apparatus.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A touch substrate, comprising:
a base substrate;
a first touch electrode layer on the base substrate and comprising a plurality of first touch electrodes;
a second touch electrode layer comprising a plurality of first coils; and
a third touch electrode layer comprising a plurality of second coils;
wherein a respective one of the plurality of first touch electrodes is electrically connected to one of the plurality of first coils;
the third touch electrode layer is insulated from the first touch electrode layer and the second touch electrode layer;
the plurality of first touch electrodes are substantially along a first direction, the respective of the plurality of first touch electrodes comprising a plurality of first touch electrode blocks extending substantially along a second direction;
the plurality of first coils are substantially along the first direction, a respective one of the plurality of first coils extending substantially along the second direction;
the plurality of second coils are substantially along the second direction, a respective one of the plurality of second coils extending substantially along the first direction; and
adjacent first touch electrode blocks of the plurality of first touch electrode blocks in the respective one of the plurality of first touch electrodes are electrically connected together by one of the plurality of first coils.

2. The touch substrate of claim 1, wherein the plurality of first touch electrodes are a plurality of capacitive touch electrodes; and
the plurality of first coils and the plurality of second coils are a plurality of electromagnetic touch electrodes.

3. The touch substrate of claim 1, wherein the respective one of the plurality of first coils has an outline shape substantially the same as one of the plurality of first touch electrodes in a display area.

4. The touch substrate of claim 1, wherein wirings of the respective one of the plurality of first coils extend substantially along edges of at least one of the plurality of first touch electrode blocks in the one of the plurality of first touch electrodes.

5. The touch substrate of claim 1, wherein wirings of the respective one of the plurality of first coils is in contact with edges of at least one of the plurality of first touch electrode blocks in the one of the plurality of first touch electrodes.

6. The touch substrate of claim 1, wherein an area encircled by a projection of wirings of the respective one of the plurality of first coils on the base substrate substantially overlaps with a projection of the one of the plurality of first touch electrodes on the base substrate in a display area.

7. The touch substrate of claim 1, wherein wirings of the respective one of the plurality of first coils in a region between adjacent first touch electrode blocks of the plurality of first touch electrode blocks are at a tilted angle with respect to the second direction.

8. The touch substrate of claim 1, further comprising:
a fourth touch electrode layer comprising a plurality of fourth touch electrodes;
wherein the respective one of the plurality of fourth touch electrodes is electrically connected to one of the plurality of second coils; and
the third touch electrode layer and the fourth electrode layer are insulated from the first touch electrode layer and the second touch electrode layer.

9. The touch substrate of claim 8, wherein the respective one of the plurality of second coils has an outline shape substantially the same as one of the plurality of fourth touch electrodes in a display area.

10. The touch substrate of claim 8, further comprising an insulating layer between the second touch electrode layer and the third touch electrode layer.

11. The touch substrate of claim 10, wherein the first touch electrode layer and the fourth touch electrode layer are in a same layer;
the touch substrate further comprises a plurality of vias extending through the insulating layer; and
the respective one of the plurality of second coils are electrically connected to adjacent fourth touch electrode blocks of the plurality of fourth touch electrode blocks in one of the plurality of fourth touch electrodes, thereby connecting the adjacent fourth touch electrode blocks.

12. The touch substrate of claim 1, wherein:
the plurality of first coils and the plurality of second coils cross over each other, forming a plurality of intersections.

13. A touch control display panel, comprising the touch substrate of claim 1.

14. A touch substrate, comprising:
a base substrate;
a first touch electrode layer on the base substrate and comprising a plurality of first touch electrodes;
a second touch electrode layer comprising a plurality of first coils;
a third touch electrode layer comprising a plurality of second coils; and
a fourth touch electrode layer comprising a plurality of fourth touch electrodes;
wherein a respective one of the plurality of first touch electrodes is electrically connected to one of the plurality of first coils;
the respective one of the plurality of fourth touch electrodes is electrically connected to one of the plurality of second coils;
the third touch electrode layer and the fourth electrode layer are insulated from the first touch electrode layer and the second touch electrode layer;
the plurality of first touch electrodes are a plurality of touch scanning touch electrodes; and
the plurality of fourth touch electrodes are a plurality of touch sensing touch electrodes.

15. A touch substrate, comprising:
a base substrate;
a first touch electrode layer on the base substrate and comprising a plurality of first touch electrodes;
a second touch electrode layer comprising a plurality of first coils;
a third touch electrode layer comprising a plurality of second coils; and
a fourth touch electrode layer comprising a plurality of fourth touch electrodes;
wherein the respective one of the plurality of first touch electrodes is electrically connected to one of the plurality of first coils;

a respective one of the plurality of fourth touch electrodes is electrically connected to one of the plurality of second coils;

the third touch electrode layer and the fourth electrode layer are insulated from the first touch electrode layer and the second touch electrode layer;

the plurality of fourth touch electrodes are substantially along a second direction, the respective one of the plurality of fourth touch electrodes comprising a plurality of fourth touch electrode blocks extending substantially along a first direction; and adjacent fourth touch electrode blocks of the plurality of fourth touch electrode blocks in the respective one of the plurality of fourth touch electrodes are electrically connected together by one of the plurality of second coils.

16. The touch substrate of claim 15, wherein wirings of the respective one of the plurality of second coils extend substantially along edges of at least one of the plurality of fourth touch electrode blocks in the one of the plurality of fourth touch electrodes.

17. The touch substrate of claim 15, wherein wirings of the respective one of the plurality of second coils is in contact with edges of at least one of the plurality of fourth touch electrode blocks in the one of the plurality of fourth touch electrodes.

18. The touch substrate of claim 15, wherein an area encircled by a projection of wirings of the respective one of the plurality of second coils on the base substrate substantially overlaps with a projection of the one of the plurality of fourth touch electrodes on the base substrate in a display area.

19. The touch substrate of claim 15, wherein wirings of the respective one of the plurality of second coils in a region between adjacent fourth touch electrode blocks of the plurality of fourth touch electrode blocks are at a tilted angle with respect to the first direction.

\* \* \* \* \*